US012070748B2

(12) United States Patent
Chen et al.

(10) Patent No.: US 12,070,748 B2
(45) Date of Patent: Aug. 27, 2024

(54) SMART WELL DEVICE, MULTIMODAL SYSTEM, AND METHOD FOR MULTI-ANALYTE MONITORING AND PROCESSING

(71) Applicant: Colorado State University Research Foundation, Fort Collins, CO (US)

(72) Inventors: Thomas W. Chen, Fort Collins, CO (US); Daniel S. Ball, Fort Collins, CO (US); Caleb R. Begly, Colorado Springs, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 438 days.

(21) Appl. No.: 16/846,330

(22) Filed: Apr. 11, 2020

(65) Prior Publication Data

US 2020/0324289 A1 Oct. 15, 2020

Related U.S. Application Data

(60) Provisional application No. 62/833,205, filed on Apr. 12, 2019, provisional application No. 62/833,082, filed on Apr. 12, 2019.

(51) Int. Cl.
*B01L 3/00* (2006.01)

(52) U.S. Cl.
CPC ....... *B01L 3/502715* (2013.01); *B01L 3/5025* (2013.01); *B01L 3/5085* (2013.01); *B01L 2200/027* (2013.01); *B01L 2300/0645* (2013.01); *B01L 2300/0825* (2013.01); *B01L 2300/0829* (2013.01)

(58) Field of Classification Search
CPC .................. B01L 2300/0645; B01L 3/502715
USPC .......................................... 422/82.03, 82.01
See application file for complete search history.

(56) References Cited

U.S. PATENT DOCUMENTS

2005/0252777 A1* 11/2005 Li ..................... G01N 27/3276 204/600
2009/0305319 A1* 12/2009 Baudenbacher ....... C12M 41/32 435/287.1

* cited by examiner

*Primary Examiner* — Natalia Levkovich
(74) *Attorney, Agent, or Firm* — Meunier Carlin & Curfman LLC

(57) ABSTRACT

A well plate for measuring an analyte in a sample is disclosed. The well plate includes at least a first, a second, and a third electrode. The first electrode has a higher sensitivity to a first analyte than the second and third electrodes. The second electrode has a higher sensitivity to a second analyte than the first and third electrodes.

23 Claims, 11 Drawing Sheets

SMART WELL DEVICE, MULTIMODAL SYSTEM, AND METHOD FOR MULTI-ANALYTE MONITORING AND PROCESSING

CROSS REFERENCE TO RELATED APPLICATION

This application claims priority from U.S. provisional patent application No. 62/833,205, titled "Smart Well Plate for Multi-Analyte Monitoring and Processing," filed on Apr. 12, 2019, and U.S. provisional patent application No. 62/833,082, titled "Smart BioBox for Real-Time Monitoring, Observation, and Multi-Analyte Analysis of Biological Samples," filed on Apr. 12, 2019, the entirety of both of which is incorporated by reference herein.

STATEMENT REGARDING FEDERALLY SPONSORED RESEARCH OR DEVELOPMENT

This invention was made with government support under grant number 1450032 awarded by the National Science Foundation. The Government therefore has certain rights in the invention.

FIELD OF THE INVENTION

This application relates to devices and methods for analyte monitoring and processing. In particular, this application relates to devices and methods for real-time measuring, collecting, and analyzing of multiple analytes within one or more sample wells containing live biological samples or otherwise.

BACKGROUND OF THE INVENTION

The determination of various cellular metabolic parameters, such as oxygen consumption rate (OCR) and extracellular acidification (ECAR), is helpful in the understanding of bioenergetics in health and disease. Abnormal cellular bioenergetics has been associated with diseases such as obesity, diabetes, cancer, neurodegeneration, and cardiomyopathy, for example. Mitochondrial respiration and glycolytic metabolism can be estimated by measuring changes in dissolved oxygen and pH. However, OCR does not provide direct information about cellular substrate utilization, and ECAR can result from both glycolysis and oxidative metabolism. OCR and ECAR data alone may provide misleading results. Thus, co-measurement of other critical analytes such as extracellular glucose and lactate flux along with OCR and ECAR may provide further insight into cellular metabolic processes.

Optical techniques, including florescence imaging, can typically be used for separately measuring analytes of interest discussed above. Optical measurement systems for imaging multiple samples typically include a plurality of wells seeded with a volume of cells and a single microscope which moves between each sample at predetermined intervals for imaging. Thus, such systems are not designed for real-time, single-cell, or simultaneous multiple analyte measurements. Even though, it is possible to devise multiple optical sensors for multiple wells for simultaneously measuring florescent/photobleaching intensity, such systems are typically very expensive. Existing electrochemical techniques also do not incorporate multi-analyte measurement seamlessly in a highly integrated and compact system. Accordingly, a need exists for real-time, single- and/or multi-cell, and simultaneous multiple analyte measurements in a highly integrated system that can be easily incorporated into the existing medical/biological technology ecosystem.

SUMMARY OF THE INVENTION

An exemplary embodiment of the present disclosure may include a well plate for measuring one or more of a first, second, third, and fourth analyte in a sample. The well plate may include at least a first, a second, and a third electrode. The first electrode may have a higher sensitivity to a first analyte than the second and third electrodes. The second electrode having a higher sensitivity to a second analyte than the first and third electrodes.

In other embodiments, the well plate may include a fourth electrode. The fourth electrode having a higher sensitivity to a third analyte than the first, second, and third electrodes. The well plate may include a fifth electrode. The fifth electrode having a higher sensitivity to a fourth analyte than the first, second, third, and fourth electrodes. Each of the first and second electrodes may have a circular shape and may be at least partially surrounded by a common electrode. The first and second electrodes may be coaxial with an arc-shaped portion of the common electrode. Each of the first and second electrodes may have a circular shape and may be at least partially surrounded by two coaxial arc-shaped electrodes. At least two of the first, second, and third electrode may be comprised of different metals. At least one of the first, second, and third electrode may be coated with an oxidase enzyme.

Another exemplary embodiment of the present disclosure may include a multimodal well plate assembly for measuring an analyte in a sample. The multimodal well plate assembly may include a first well plate having at least two electrodes, a cylindrical sidewall, and a closure covering the well plate. At least a portion of the closure may be transparent. The assembly may also include an electrical circuit configured to measure at least one of a voltage or a current between the two electrodes, and an optical instrument configured to take images inside the first well plate while the electrical circuit measures the voltage or current between the electrodes of the first well plate.

In other embodiments, the multimodal well plate assembly may include a second well plate having at least two electrodes, a cylindrical sidewall, and a closure covering the well plate. At least a portion of the closure may be transparent. The optical instrument may be configured to take images inside the second well plate while the electrical circuit measures the voltage or current between the electrodes of the second well plate. The first well plate may have at least four electrodes, and the electrical circuit may be configured to measure a voltage between two electrodes and a current between two other electrodes. The electrical circuit may be configured to multiplex the measured voltage between two electrodes and the measured current between two other electrodes. The electrical circuit may be configured to measure a voltage between two electrodes of the first well plate and current between two electrodes of the second well plate. The electrical circuit may be configured to multiplex the measured voltage between two electrodes of the first well plate and the measured current between two electrodes of the second well plate.

Another exemplary embodiment of the present disclosure may include a well plate assembly for measuring one or more analytes in a sample. The well plate assembly may include a plurality of separate well plates. Each of the plurality of separate well plates may have at least two electrodes. An electrode from a first one of the plurality of separate well plates may have a higher sensitivity to an analyte than any electrode from a second one of the plurality of separate well plates.

In other embodiments, the well plate assembly may include an electrical circuit configured to measure at least a voltage between two electrodes in the first one of the plurality of separate well plates and a current between two electrodes in the second one of the plurality of separate well plates. At least one electrode from each of the plurality of separate well plates may be comprised of a same first material. The electrical circuit may be configured to measure a current between two electrodes in the first one of the plurality of separate well plates. The electrical circuit may be configured to measure a voltage between two electrodes in the second one of the plurality of separate well plates. An electrode from the second one of the plurality of separate well plates may have a higher sensitivity to a different analyte than any electrode from the first one of the plurality of separate well plates. At least one second electrode from each of the plurality of separate well plates may be comprised of a same material different from the first material.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION

Reference will now be made in detail to the exemplary embodiments, which are illustrated in the accompanying drawings. Wherever possible, the same reference numbers will be used throughout the drawings to refer to the same or like parts.

Figure 1A:
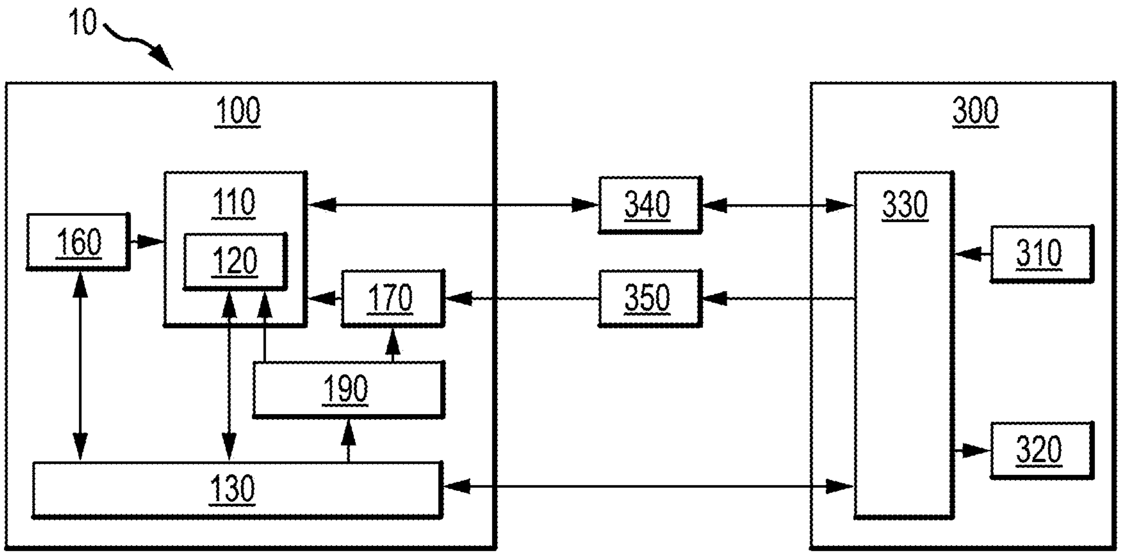
FIGS. 1A and 1B are functional diagrams illustrating smart well systems according to exemplary embodiments of the present disclosure.

FIG. 1A depicts an embodiment of a system 10 for analyte monitoring and processing with a smart well plate 100. The smart well plate 100 may operate as a stand-alone device, i.e., it can acquire, save, and process data without being connected to a separate processing unit either physically or wirelessly. In the system shown, the smart well plate 100 may communicate with an interfacing unit 300. The interfacing unit 300 may include a personal computer (PC), portable computer such as a laptop, notebook, or Ultrabook, a mobile phone, including a smart phone, tablet, or any other device that may receive data from or output data to a user. The interfacing unit 300 may include one or more input device 310, such as a keyboard, including a physical keyboard or touchscreen keyboard, keypad, mouse, or any other device configured to input information from a user. The interfacing unit 300 may also include a display 320, such a computer monitor, laptop display, mobile phone display, tablet display, or any other device configured to visually display information to a user. The interfacing unit 300 may also include a processing unit 330, which may include circuitry for receiving, transmitting, storing, and processing information. The processing unit 330 of the interfacing unit 300 may communicate with a processing unit 130 of the smart well plate 100 via a cable connection, such as USB, or a wireless connection, such as Bluetooth or Wi-Fi. Such communication may include processing unit 330 sending commands or data to processing unit 130 and/or processing unit 130 sending commands or data to processing unit 330.

The processing unit 130 may control the operation of a thermal unit 160 to heat well plates 110 and control a motor unit 190 to engage/disengage glass well chips 120 and a microfluidic unit 170. Once the glass well chips 120 have been engaged, the processing unit 130 may excite and/or monitor the glass well chips 120 and acquire data therefrom. The processing unit 130, thermal unit 160, the well plates 110, the motor unit 190, the glass well chips 120, and the microfluidic unit 170 are described in more detail with respect to FIGS. 2A-5B.

An external optical microscope 340 may be optically connected to the well plates 110 to capture images and/or record video during data acquisition from glass well chips 120. As shown in FIG. 1A, the processing unit 330 may initiate various commands to the external optical microscope 340 and may acquire and save images generated therefrom. In addition, the processing unit 130 may also initiate various commands to the external optical microscope 340 via the processing unit 330. The external optical microscope 340 may be the same or similar to an internal optical microscope 240 discussed in more detail below.

An external pump 350, such as a syringe pump, may be in fluidic communication with the microfluidic unit 170 to deliver a liquid substance to the well plates 110, such as a buffer solution, a drug, or any other substance to be studied. In addition, one or more external pumps may be used to deliver multiple liquid substances. As with the external microscope 340, the processing unit 330 may initiate various commands to the external pump 350 to control the delivery of the liquid substance. In addition, the processing unit 130 may also initiate various commands to the external pump 350 via the processing unit 330. The external pump 350 may be the same or similar to an internal pump 250 discussed in more detail below.

Figure 1B:
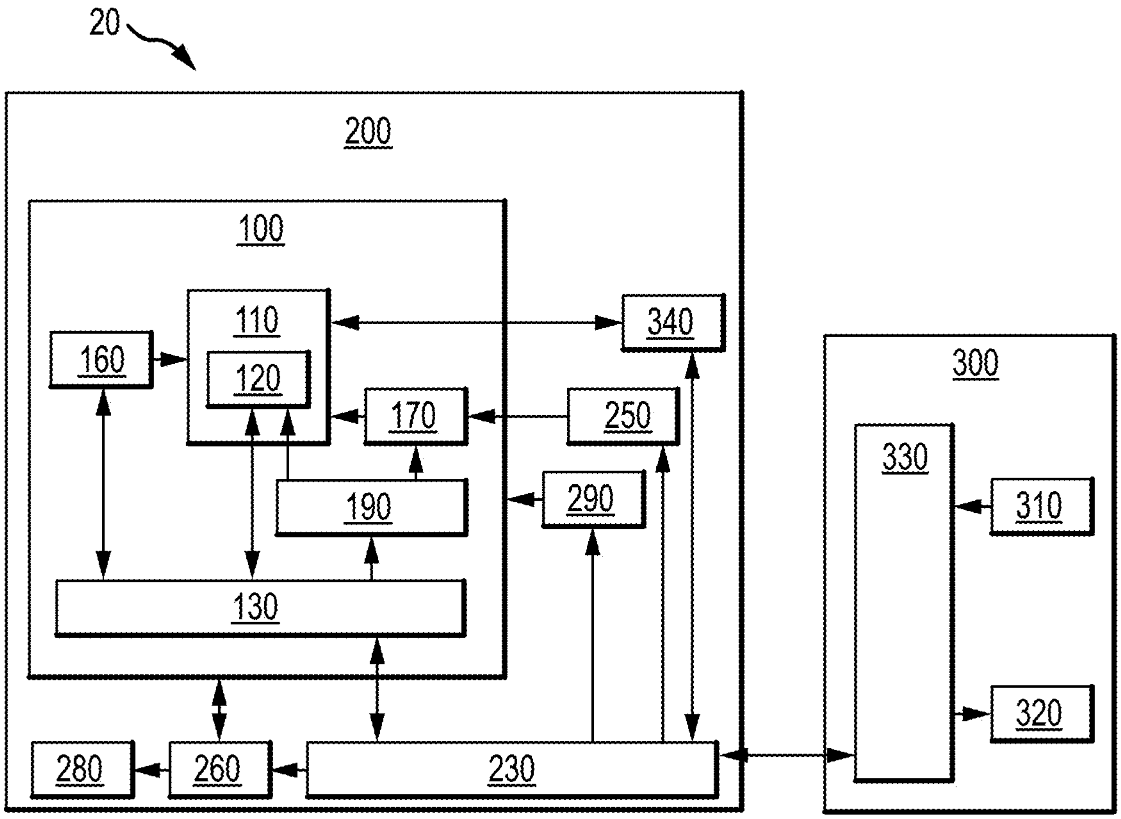

FIG. 1B depicts an embodiment of a system 20 for analyte monitoring and processing with the smart well plate 100. As with the system 10, the system 20 may also include an interfacing unit 300 and a smart well plate 100. The smart well plate 100 may be located in an incubator 200. The processing unit 130 may communicate with a processing unit 230 of the incubator 200 via a cable connection, such as USB, or a wireless connection, such as Bluetooth or Wi-Fi. Such communication may include processing unit 230 sending commands or data to processing unit 130 and/or processing unit 130 sending commands or data to processing unit 230. The processing unit 230 may act as a relay between the processing units 130 and 330, such that the processing unit 330 may send commands to processing unit 130 in addition to processing unit 230.

The processing unit 230 may control the operation of a thermal unit 260 to heat the smart well plate 100 and ultimately the well plates 110 and a humidifier unit 280. The processing unit 230 may also control the operation of motor unit 290 to position one of the well plates 110 in front of an internal optical microscope 240. The processing unit 230, thermal unit 260, humidifier unit 280, and the motor unit 290 are described in more detail with respect to FIGS. 6A-9.

The internal optical microscope 240 may be optically connected to the well plates 110 to capture images and/or record video during data acquisition from glass well chips 120. The processing unit 230 or 330 may initiate various commands to the internal optical microscope 240 and may acquire and save images generated therefrom. In addition, the processing unit 130 may also initiate various commands to the internal optical microscope 240 via the processing unit 230 and/or processing unit 330. The internal optical microscope 240 is discussed in more detail with respect to FIGS. 6B and 7.

An internal pump 250, such as a syringe pump may be in fluidic communication with the microfluidic unit 170 to deliver the liquid substance to the well plates 110. As with the internal optical microscope 240, the processing unit 230 or 330 may initiate various commands to the internal pump 250 to control the delivery of the liquid substance. In addition, the processing unit 130 may also initiate various commands to the internal pump 250 via the processing unit 230 and/or processing unit 330.

Figure 2A:
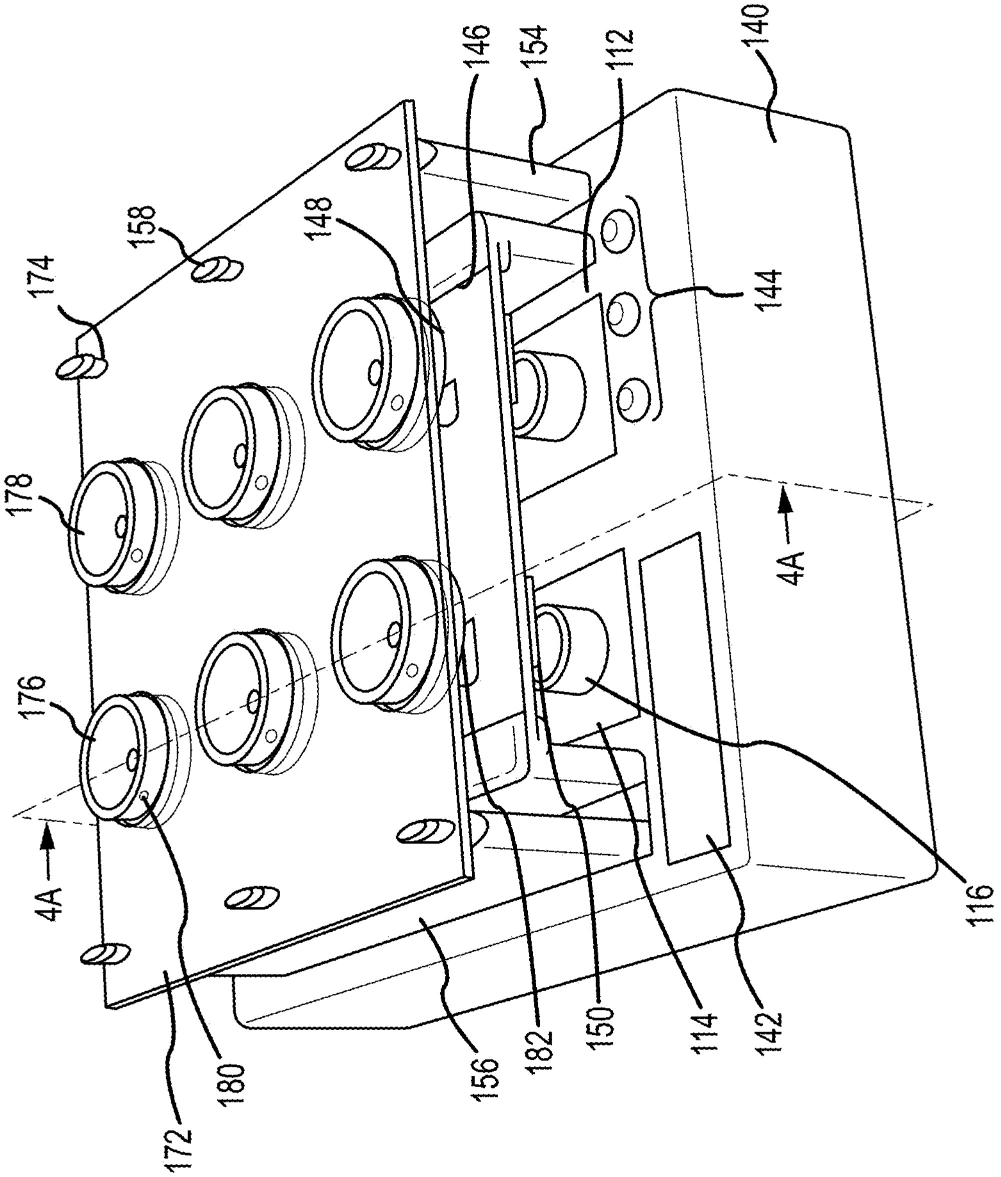
FIG. 2A is a perspective view of the smart well plate from FIGS. 1A and 1B, shown in an unconnected state.
Figure 2B:
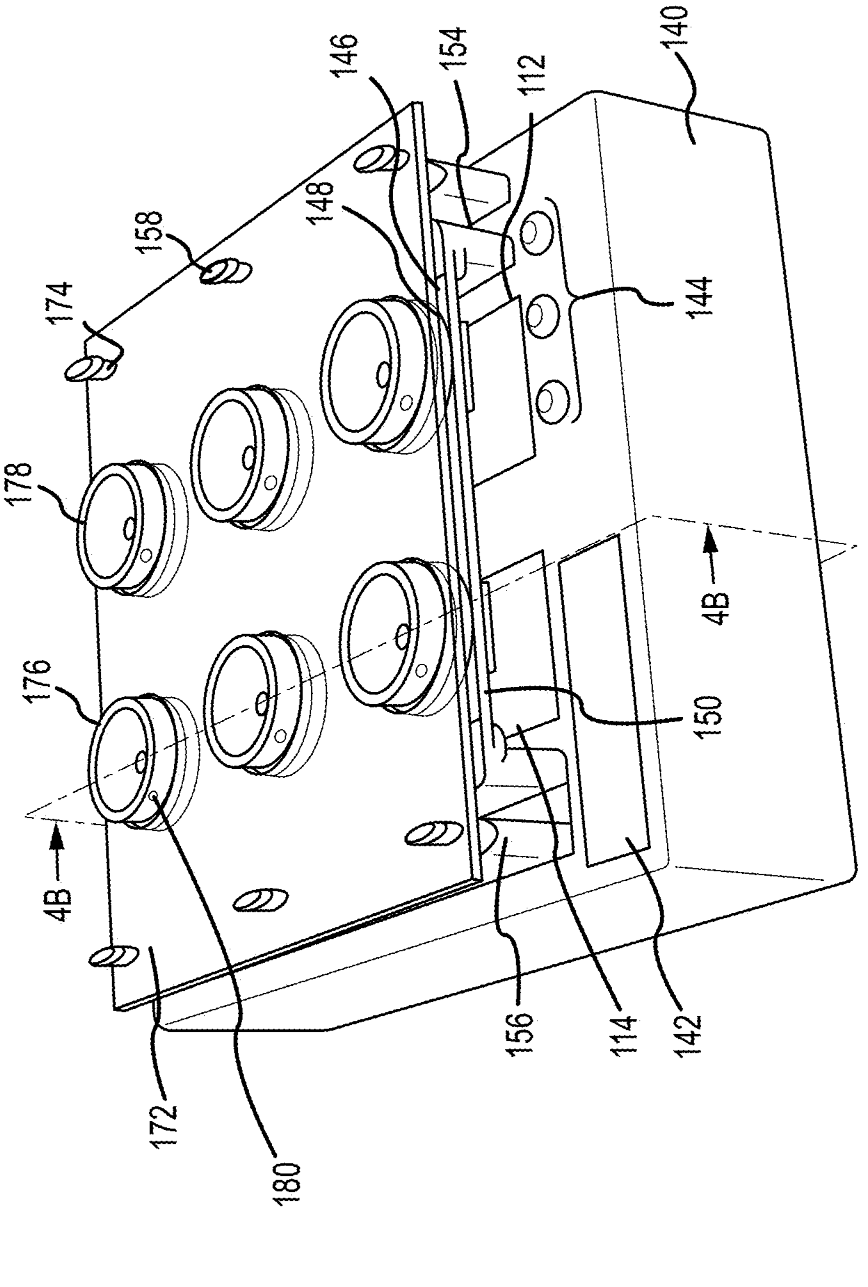
FIG. 2B is a perspective view of the smart well plate from FIG. 1, shown in a connected state.
Figure 3:
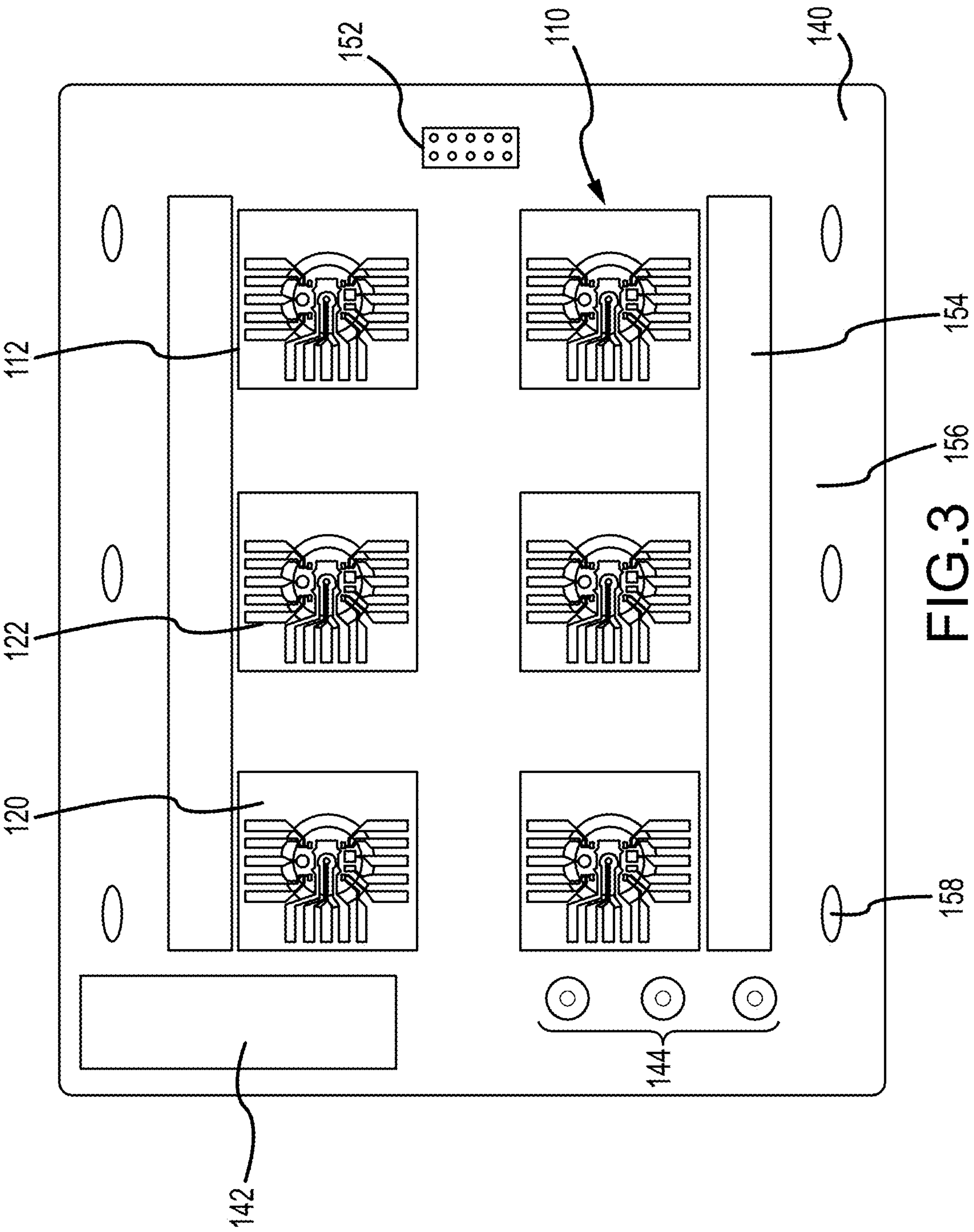
FIG. 3 is a plan view of the smart well plate from FIGS. 2A and 2B, shown without the connector board and the microfluidic board.
Figure 4A:
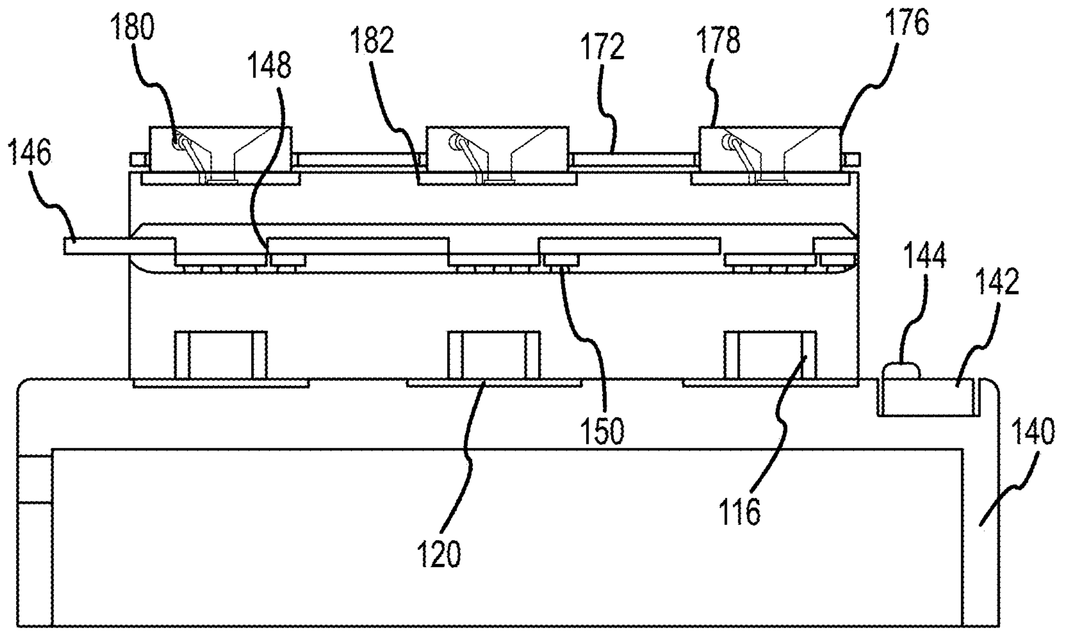
FIG. 4A is a sectional view of the smart well plate from FIG. 2A, taken along line 4A-4A.
Figure 4B:
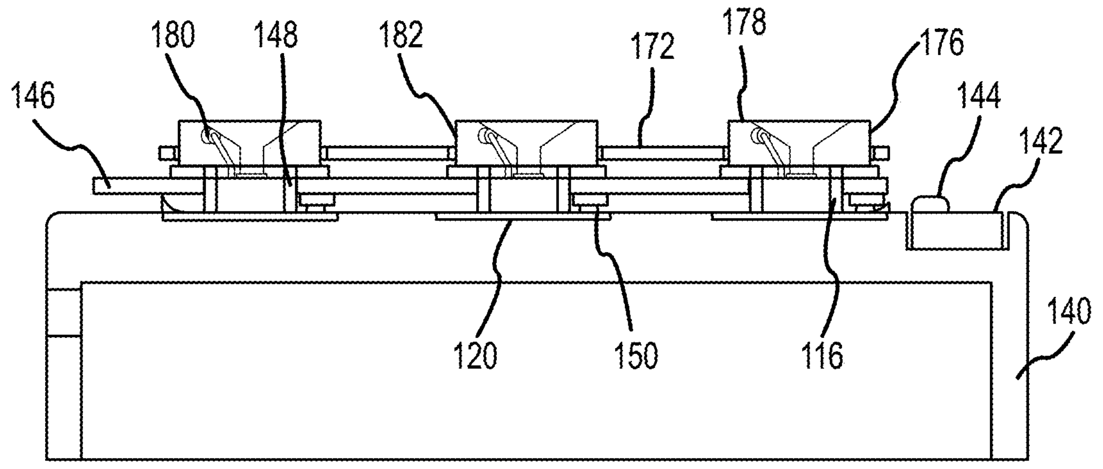
FIG. 4B is a sectional view of the smart well plate from FIG. 2B, taken along line 4B-4B.
Figure 5A:
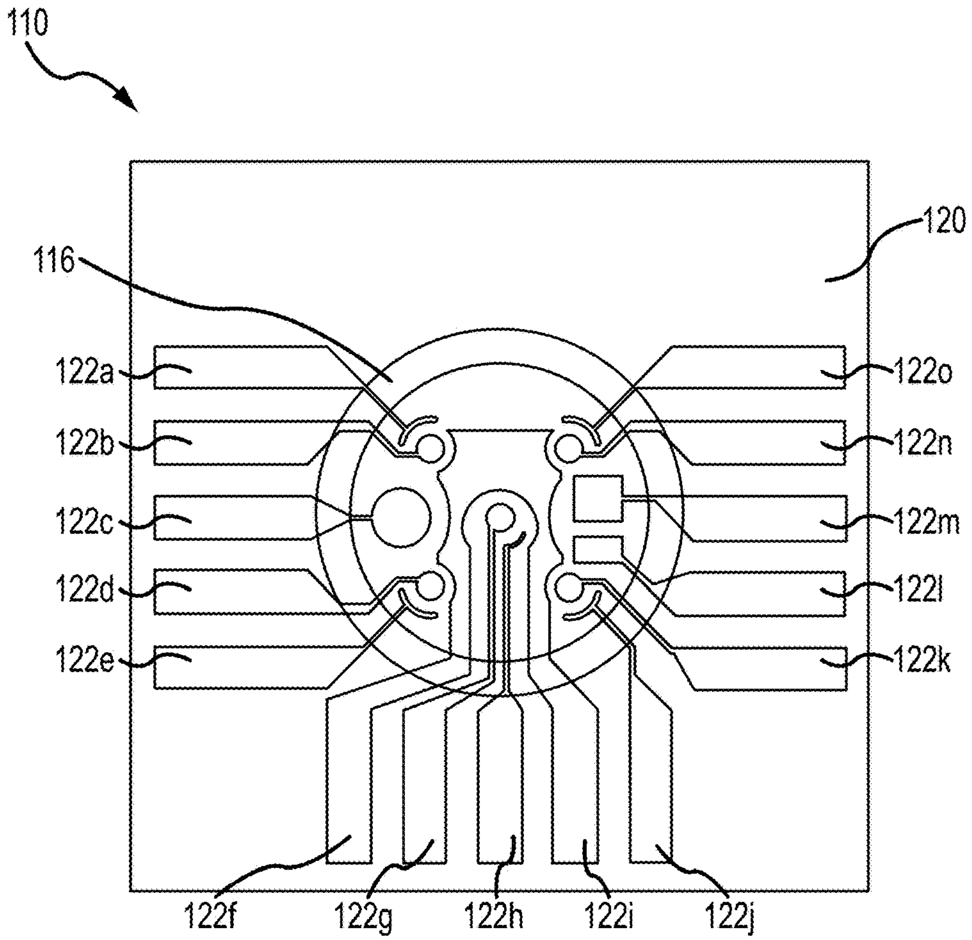
FIG. 5A is a plan view of a glass well chip from FIG. 3.
Figure 5B:
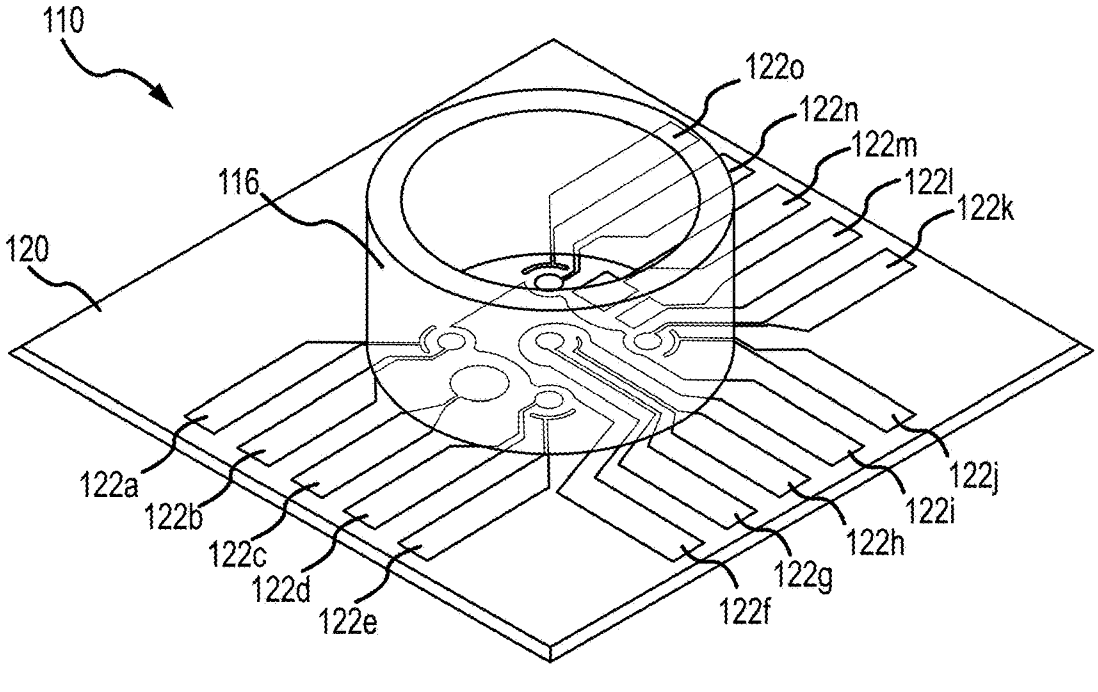
FIG. 5B is a perspective view of a glass well chip from FIG. 5A.
Figure 6B:
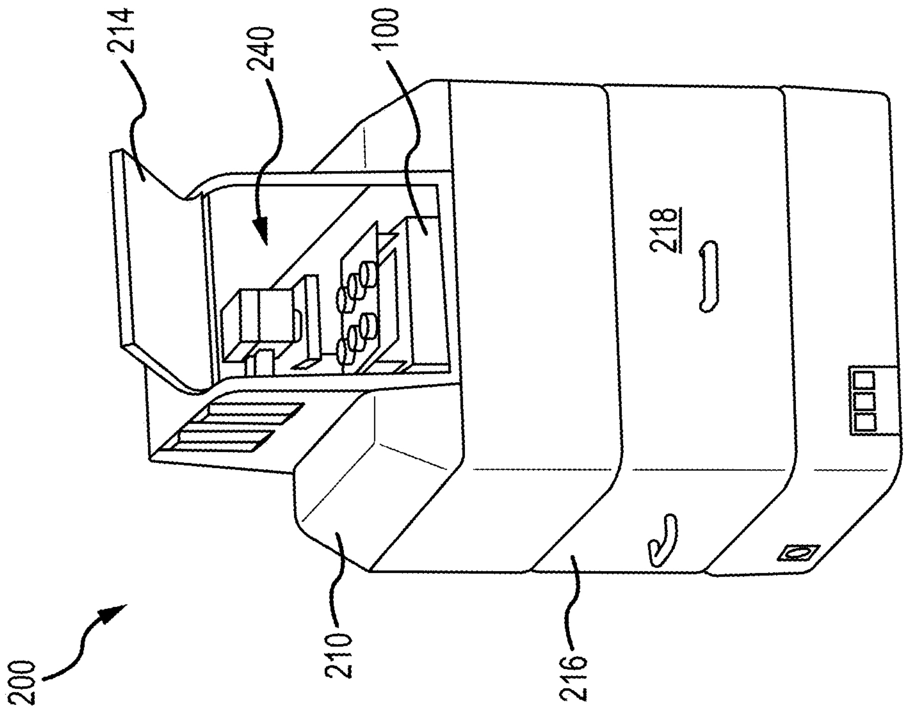
FIG. 6B is a perspective view of an incubator from FIG. 6A with a door in an open position.
Figure 6A:
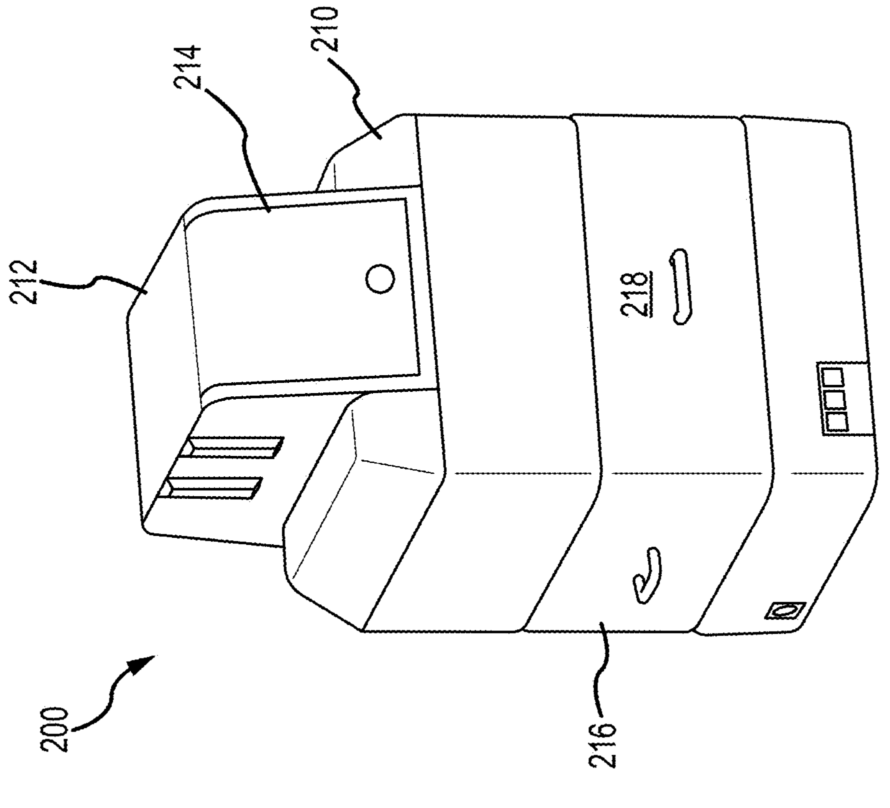
FIG. 6A is a perspective view of an incubator from FIG. 1B.
Figure 7:
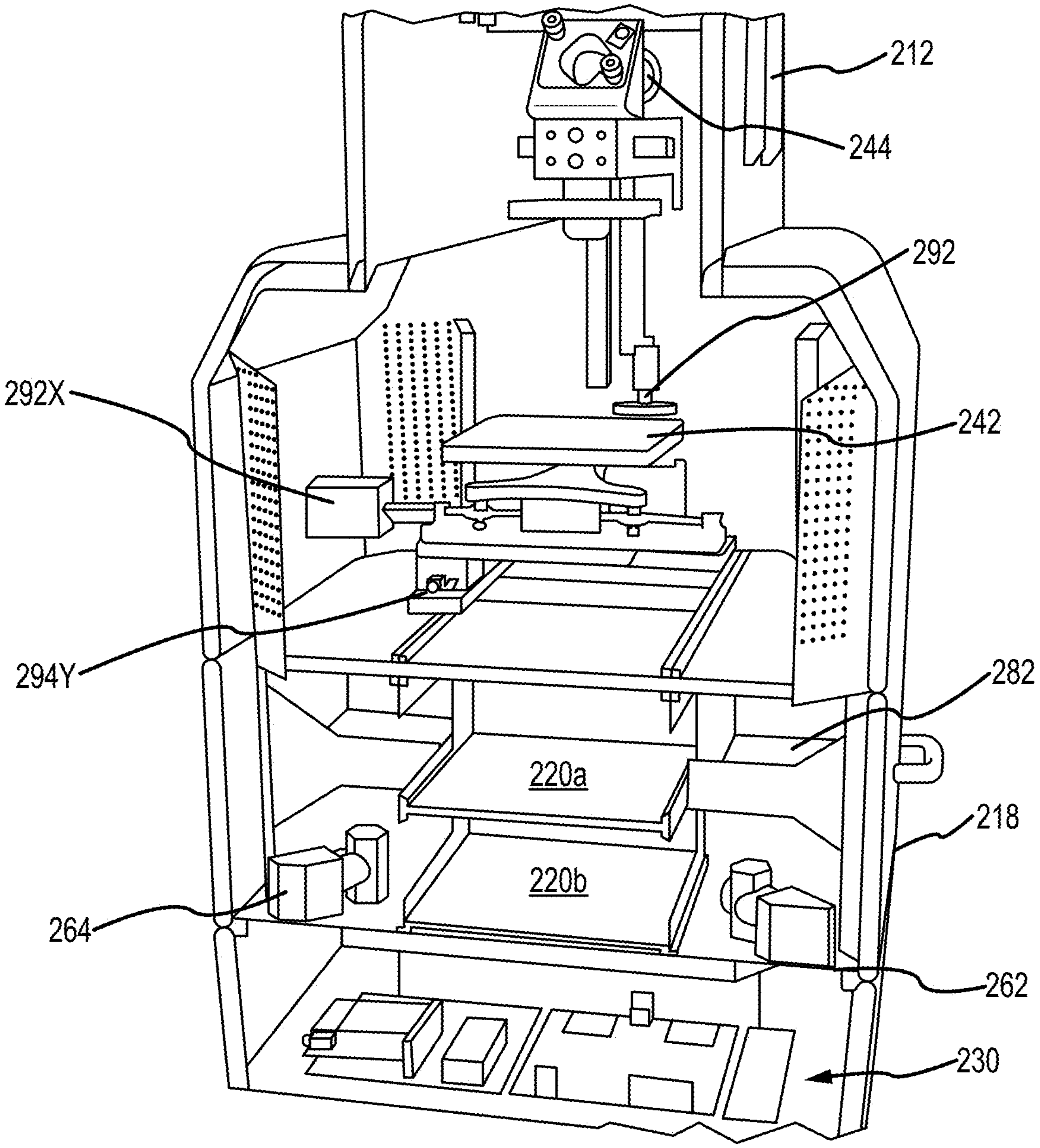
FIG. 7 is a perspective, sectional view of the incubator from FIG. 6A.
Figure 8:
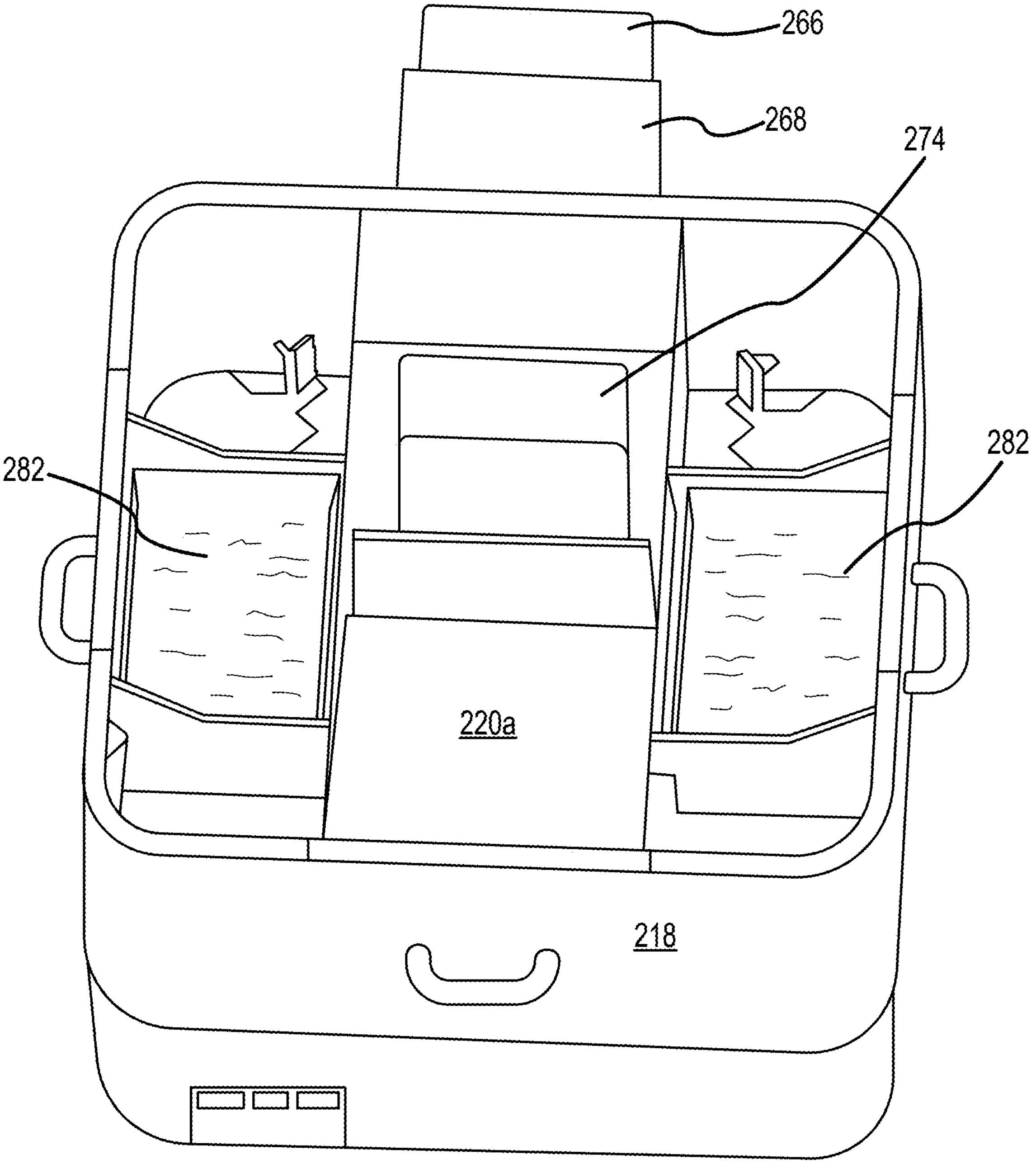
FIG. 8 is a perspective, sectional view of the incubator from FIG. 6A.

FIGS. 2A-4B illustrate the smart well plate 100 of FIGS. 1A and 1B. Specifically, FIGS. 2A and 4A depict the smart well plate 100 in an unloaded state and FIGS. 2B and 4B depict the smart well plate 100 in a loaded state. The smart well plate 100 includes a housing 140 that houses the processing unit 130, thermal unit 160, and motor unit 190. The housing 140 may have a display 142, such as, for example, LED display or LCD, connected to the processing unit 130 and configured to display a status of the smart well plate 100. For example, the display 142 may indicate: that it is ready to connect the glass well chips 120 to the processing unit 130, which of the glass well chips 120 are connected to the processing unit 130, whether a test is currently being conducted, an elapsed time from a test being conducted, a test identification number or description, the temperature, completion of a test, an error, etc.

The housing 140 may also include one or more input buttons 144 for inputting a command to the processing unit 130. The input buttons 144 may be configured to connect/disconnect the glass well chips 120 to the processing unit 130. The input buttons 144 may also be configured to allow system calibration using special-purpose inserts in place of the glass well chips (not shown). For this process, the input buttons 144 may be labeled "load" and "eject" for loading/ejecting a connector board 146 which may result in the connection and disconnection of the glass well chips 120 to and from the processing unit 130. The input buttons 144 may also be configured to start or stop a test or a calibration. Alternatively, loading or ejecting the connector board 146 may initiate or stop a test, respectively. The connector board 146 may be a printed circuit board having a repeating pattern of through-holes 148, which may be circular having a diameter larger than the sidewalls of the well plates 110. The number of through-holes 148 may be equal to the number of well plates 110, such as, for example, a single well, 6 wells, 12 wells, 24, wells, 48, wells, 96 wells, or any desired integer number of well plates 110. In the exemplary embodiments shown in the Figures, a connector board 146 having 6 through-holes 148 is shown. The underneath side of the connector board 146 facing the housing may have a pattern of electrically conductive pins 150 extending perpendicular to the connector board 146 and connected to various electrical traces within or on a surface of the connector board 146. The conductive pins 150 may be gold-plated, spring-actuated pins configured to maintain an electrical connection through an abutment interface. For example, the as the conductor board 146 is lowered toward the housing 140, the conductive pins 150 may contact conductive traces 122 of the glass well chips 120 at a first vertically-spaced distance with the springs in a relaxed un-stretched condition. The connector board may be further lowered to a second vertically-spaced distance less than the first vertically-spaced distance, thereby compressing the springs and causing them to force the electrical pins 150 against the conductive traces 122 and ensuring a stable electrical connection therebetween. The electrical traces within or on the connector board 146 may terminate at a connector (not shown) configured to connect the connector board 146 to the processing unit 130. The connector may directly connect to a mating connector 152 (FIG. 3) on the surface of the housing 140 or may connect to the mating connector 152 via a cable (not shown), such as a ribbon cable.

The connector board 146 may be releasably mounted to a pair of inner arms 154 along lateral edges of the connector board 146 and vertically suspended above a top surface of the housing 140. The inner arms 154 may have inwardly facing lateral grooves for holding the lateral edges of the connector board 146. The inner arms 154 may have a stop and/or a latch (not shown) for releasably securing the connector board 146 in an alignment position where the through-holes 148 are coaxial with the well plates 110. Each of the inner arms 154 may extend vertically through a corresponding slot in the top surface of the housing 140 and may be linearly actuated in the vertical direction by the motor unit 190. The motor unit 190 may comprise one or more linear actuators driven by a stepper or servo motor. The pair of inner arms 154 may be mechanically linked together so as to be driven by a single motor. The motor may be controlled by a PWM controller of the processing unit 130 and may be configured to be locked with the inner arms 154 in the extended and retracted positions to prevent unintended movement therefrom.

The microfluidic unit 170 may include a microfluidic board 172 having a repeating pattern of well closures 176 corresponding to the number and arrangement of the through-holes 148. The well closures 176 may be integral with the microfluidic board 172 or affixed thereto and may be comprised of a transparent material, such as a glass or plastic, including, for example, polymethyl methacrylate. The well closures 176 may have a cylindrical sidewall extending above the microfluidic board 172 and an inwardly-concave or funnel-shaped top surface 178. The sidewall may include one or more connection ports 180 for connecting tubing (not shown) thereto. The bottom surface of the microfluidic board 172 may include a downwardly extending elastomeric seal 182, such as a gasket or O-ring, extending oppositely from the cylindrical sidewall. The microfluidic board 172 may be mounted to a pair of outer arms 156 via vertically extending standoffs 158. The standoffs 158 are configured to engage a corresponding mounting hole 174 in the microfluidic board 172 and coaxially align the well closures 176 with corresponding well plates 110. Each of the outer arms 156 may extend vertically through a corresponding slot in the top surface of the housing 140 and may be linearly actuated in the vertical direction by the motor unit 190. The motor unit 190 may actuate the outer arms 156 independently from the inner arms 154 with a separate linear actuator operating in a similar manner described above with regard to the inner arms 154, or the outer arms 156 may be mechanically linked to the inner arms 154 so that a single linear actuator may actuate all four of the individual arms.

The top surface of the housing 140 may include a repeating pattern of recesses 112 sized and shaped to accommodate well plates 110 and corresponding to the number and arrangement of the through-holes 148. The well plates 110 may have a base plate, such as a glass well chip 120, and cylindrical sidewalls 116 extending vertically therefrom. Moreover, each well plate 110, may have a separate base plate with a square or rectangular footprint that extends beyond the perimeter of the cylindrical sidewalls 116. The well plates 110 may be retained in their respective recesses 112 using, for example, a friction fit, latch, adhesive, tape, or fasteners. The cylindrical sidewalls 116 and the base plate may be integral or separate and may be comprised of similar or dissimilar materials. For example, the glass well chip may be comprised of glass and the cylindrical sidewall 116 may be comprised of a polymer, such as an acrylic plastic.

The glass well chips 120 may include a number of the conductive traces 122 in various patterns extending from near an outer edge of the glass well chip 120 to within a circle formed by the interior surface of the cylindrical sidewall 116. In the embodiment shown in FIGS. 5A and 5B, the glass well chip 120 includes 15 conductive traces 122*a*-122*o*. Each of the conductive traces 122 may have three general portions: an edge portion nearest the edge of the glass well chip 120, an electrode portion located within the area circumscribed by the cylindrical sidewall 116, and a routing or neck portion connecting the edge portion to the electrode portion. The neck portion may have a narrowest width of the conductive trace 122 and may have at least a portion thereof directly below the cylindrical sidewall 116. The conductive traces 122 may comprise electrical conductors, such as, carbon fiber, gold, silver, silver/silver chloride, platinum, or indium tin oxide (ITO). ITO may be used as a pH sensitive electrode. In addition, the conductive traces 122 may include surface chemistry modifications to enhance selectivity to various analytes. For example, the surface chemistry may include: Nafion as a solid-state electrolyte and/or membrane for enhanced sensitivity to oxygen; glucose oxidase enzyme (GOx) and Nafion for enhanced sensitivity to glucose; and lactose oxidase (LOx) and Nafian for enhanced sensitivity to lactose; among other enzymes. In some embodiments, conductive traces 122*f* and 122*i* may have routing portion that is wider than the routing portion of other conductive traces, such as routing portion of conductive traces 122*a*-122*d*, 122*g*, 122*h*, and 122*j*-122*o*. In some embodiments, the routing portion of 122*f* and 122*i* may be wider than the aforementioned conductive traces by a factor of 2, a factor of 3, a factor of 4, or a factor of 5.

The glass well chips 120 may be configured to simultaneously detect multiple different analytes within a same well plate 110. For example, a glass well chip 120 may be configured to detect oxygen, pH, glucose, and lactose. In another example, a different glass well chip 120 may be configured to detect sucrose and fructose. Because the glass well chips may be configured differently from one another, the smart well plate 100 may be configured to measure different analytes in different wells at the same time. Furthermore, because each well plate 110 is separate from one another, a user may load different configurations of glass well chips 120 for a first test, and then run a second test with a different configuration of glass well chips 120.

In an exemplary embodiment, a first glass well chip 120 may be configured as follows: conductive traces 122*a*, 122*e*, 122*h*, 122*j*, 122*l*, and 122*o* may comprise silver/silver chloride; conductive traces 122*b*, 122*c*, 122*d*, 122*g*, 122*k*, and 122*n* may comprise gold; conductive trace 122*m* may comprise ITO; conductive trace 122*a* may be modified with GOx; conductive trace 122*g* may be modified with Nafion; conductive trace 122*k* may be modified with LOx; and conductive traces 122*d* and 122*n* may be modified with other constituents not expressly discussed in this disclosure or they may be unmodified. A second glass well chip 120 may be configured as follows: conductive traces 122*a*-122*l*, 122*n*, and 122*o* may comprise gold; conductive trace 122*m* may comprise ITO; and conductive trace 122*g* may be modified with Nafion. A third glass well chip 120 may be configured as follows: conductive traces 122*a*, 122*e*, 122*h*, 122*j*, 122*l*, and 122*o* may comprise silver/silver chloride; conductive traces 122*b*, 122*c*, 122*d*, 122*g*, 122*k*, and 122*n* may comprise gold; conductive trace 122*m* may be omitted; conductive trace 122*a* may be modified with GOx; and conductive trace 122*k* may be modified with LOx.

In some embodiments, six (6) glass well chips 120 may be configured according to the first configuration as discussed above and loaded into the smart well plate 100. In some other embodiments, three (3) glass well chips 120 may be configured according to the second configuration as discussed above and loaded into the smart well plate 100 at the same time that three (3) glass well chips 120 may be configured according to the third configuration as discussed above and loaded into the smart well plate 100.

As discussed above, the processing unit 130 may acquire data from the glass well chips. More particularly, the processing unit 130 may include amperometry circuitry for measuring an analyte in a sample, such as oxygen, lactose, glucose, sucrose, and fructose, and potentiometry circuitry also for measuring an analyte in a sample, such as pH. The potentiometry circuitry may measure voltages whereas the amperometry circuitry may measure current. The amperometry circuitry may connect to conductive traces 122*b*, 122*c*, 122*d*, 122*g*, 122*k*, and 122*n* as working electrodes, conductive traces 122*a*, 122*e*, 122*h*, 122*j*, and 122*o* as reference electrodes, and conductive traces 122*f* and 122*i* as counter electrodes. The potentiometry circuitry may connect to conductive trace 122*m* as a working electrode and one or both of conductive traces 122*c* and 122*l* as reference electrodes. The processing unit 130 may include memory to record such measurements and a multiplexor to multiplex the measured signals. For example, measured signals from a particular glass well chip 120 may be multiplexed and signals from multiple glass well chips 120 may be multiplexed. The processing unit 130 may also include analog-to-digital converters (ADCs) and microprocessor units to provide signal conditioning and post-processing in the digital domain.

The temperature of the well plates 110 may be maintained by the thermal unit 160. The thermal unit 160 may include a heating element (not shown) mounted inside the housing 140. In some embodiments, the heating element is mounted onto or near the well plates 110. In some embodiments, one or more heating elements are mounted to various locations on the underside of the top surface of the housing for efficiently conducting heat to the inside of the well plates 110 and to maintain at least two different wells at different predetermined temperatures. The thermal unit 160 may also include one or more temperature sensors (not shown), such as a thermistor or thermocouple, which may be connected to the processing unit 140. The heating element may be connected to a power supply (not shown) through a switch, such as a relay or a MOSFET controlled by the processing unit 140. The processing unit 140 may control the thermal unit 160 using a PID or PI controller through software or dedicated circuitry.

FIGS. 6A-10 illustrate the incubator 200 of FIG. 1B. The incubator 200 may include a housing 210 that may house the smart well plate 100, processing unit 230, internal optical microscope 240, internal pump 250, thermal unit 260, humidifier unit 280, and motor unit 290. The housing 210 may have three vertical levels with a dome structure 212 above the third level. The second and third levels and the dome structure 212 may have an outer double-wall construction with an insulating material, gas, or vacuum positioned therein. The dome structure 212 may include an access door 214 for loading the smart well plate 100 onto a stage 242 of the internal optical microscope 240. The second level sides of the housing 210 may include a pair of opposing humidifier drawers 216, each having a humidifier reservoir 282 therein. The humidifier drawers 216 may provide easy access for manually filling the reservoirs 282. The second level front of the housing 210 may include a storage drawer 218 providing access to upper and lower storage shelves 220*a* and 220*b*.

The first level of the housing 210 may house the processing unit 230 in a compartment isolated from the upper levels. The outer walls of the housing 210 for the first level may be a single-wall construction instead of the double-wall construction as on the second and third levels. The third level of the housing 210 may house the internal optical microscope 240, with a camera 244 extending into the dome 212 structure. The motor unit 290 may include three motors, such as stepper motors 292*x*, 292*y*, and 292*z*, and may be configured to move the stage 242 in directions parallel to the x-, y-, and z-axes, respectively. The camera 244 may have an optical resolution of 2.75 microns or better and the motors 292*x*-292*y* may have a linear movement resolution less than 2 microns. The camera 244 and the internal optical microscope 240, may be programmed to autonomously move to and from different well plates 110 and capture images while simultaneously acquiring electrochemical data of the same well plates.

Figure 9:
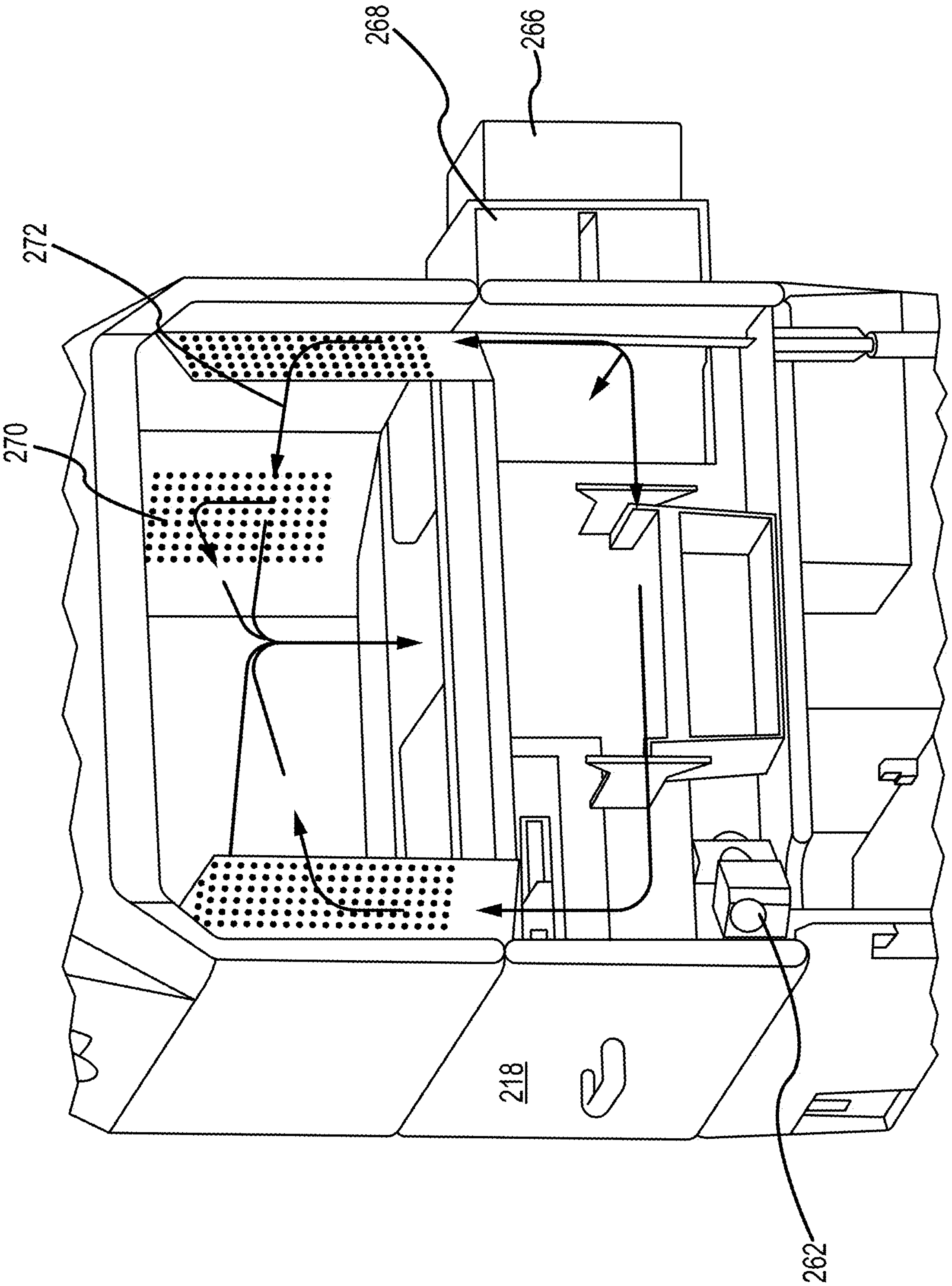
FIG. 9 is a perspective, sectional view of the incubator from FIG. 1B.

Temperature and humidity within the housing 210 may be maintained by the thermal unit 260 and the humidifier unit 280. Each humidifier reservoir 282 includes a heating element (not shown) to maintain the water temperature. Because of the relatively large size of the humidifier reservoirs 282 and the housing 210 being insulated, the two humidifier reservoirs help keep the temperature stable. In addition, two thermoelectric coolers 268 are able to more quickly adjust the temperature within the housing 210. For example, an outer fan 266 and an inner fan 274 may circulate air within the housing 210 along the pathway 272 as shown in FIG. 9. The air may circulate over the Peltier heater/coolers 268 from the inside to the outside of the second level and from the second level to the third level at the outer corners of the housing 210. The outer corners of the housing 210 have a connecting channel therebetween. In the third level, a porous screen 270 helps diffuse the air into the third level. The airflow may also be routed over the humidifier reservoirs 282 to humidify the air flowing within the housing 210. The incubator 200 may have two solenoid controlled gas inlets 262, 264 for inputting dehumidified gasses, such as, air, oxygen, nitrogen, carbon dioxide, etc. Thus, the incubator may exhaust humid air to the outside of the housing and replenish the air with dry gasses to effectively dehumidify the air within the housing. In addition, airflow may be diverted to or away from the humidifier reservoirs 282 to maintain a desired humidity. Temperature and humidity may be measured at various positions inside of the housing 210 with humidity and temperature sensors (not shown). The processing unit 230 may then control the temperature and the humidity using a PID or PI controller within the processing unit 230 with a resolution of +/−0.1 C.

Figure 10:
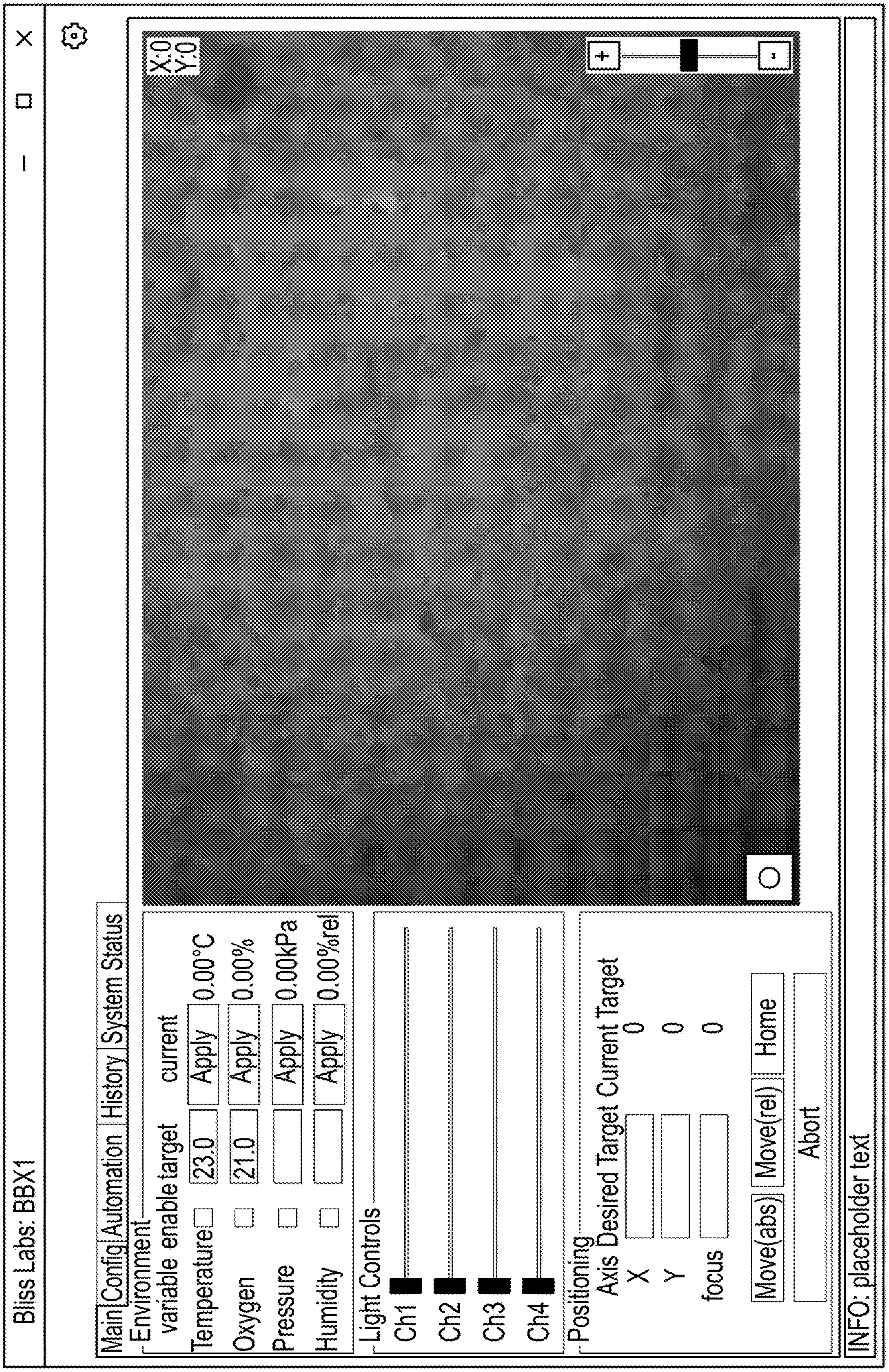
FIG. 10 is a graphics user interface from the display from FIG. 1B.

FIG. 10 discloses a graphical user interface for the incubator 200, in which a user may adjust various parameters such as temperature, oxygen, pressure, humidity, and light controls, and the user may position the well plate 110 under the internal optical microscope 240.

It should be understood from the foregoing that, while particular aspects have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A well plate for measuring one or more of a first, second, third, and fourth analyte in a sample, the well plate comprising:

a base plate defining a bottom of the well plate;

a sidewall extending vertically from and surrounding the base plate;

a set of electrodes including at least a first, a second, and a third electrode located at the bottom of the well plate, wherein the first electrode comprises surface chemistry modification having glucose oxidase as a first coating to have a higher sensitivity to glucose than the second and third electrodes, wherein the second electrode comprises a second surface chemistry modification having lactose oxidase as a second coating to have a higher sensitivity to lactate than the first and third electrodes, and wherein the third electrode comprises a third surface chemistry modification having a solid-state-electrolyte as a third coating to have a higher sensitivity to oxygen than the first and second electrodes;

a set of conductive pins that electrically connect to the set of electrodes, including a first conductive pin that connects over a first conductive trace along the bottom of the well plate to the first electrode, a second conductive pin that connects over a second conductive trace along the bottom of the well plate to the second electrode, and a third conductive pin that connects over a third conductive trace along the bottom of the well plate to the third electrode; and electrical circuitry operatively coupled to the set of conductive pins of the well plate, wherein the electrical circuitry is configured to measure the first electrode, the second electrode, and the third electrode to provide a measure of abnormal or normal cell metabolism.

2. The well plate of claim 1, further comprising a fourth electrode, the fourth electrode comprises a fourth surface chemistry modification as a fourth coating to have a higher sensitivity to a fourth analyte than the first, second, and third electrodes.

3. The well plate of claim 2, wherein each of the first and second electrodes has a circular shape portion and is at least partially surrounded by at least one conductive trace configured as a shared counter electrode.

4. The well plate of claim 1, wherein each of the first and second electrodes has a circular shape portion and are at least partially surrounded by at least one arc-shaped conductive trace configured as a reference electrode that is concentric with respect to the respective first and second electrodes.

5. The well plate of claim 1, wherein at least two of the first, second, and third electrodes are comprised of different metals.

6. A multimodal well plate for measuring an analyte in a sample, the assembly comprising:

a first well plate having:

a base plate defining a bottom of the first well plate;

a sidewall extending vertically from and surrounding the base plate;

a plurality of electrodes including at least a first, a second, and a third electrode located at the bottom of the first well plate, wherein the first electrode comprises surface chemistry modification having glucose oxidase as a first coating to have a higher sensitivity to glucose than the second and third electrodes, wherein the second electrode comprises a second surface chemistry modification having lactose oxidase as a second coating to have a higher sensitivity to lactate than the first and third electrodes, and wherein the third electrode comprises a third surface chemistry modification having a solid-state-electrolyte as a third coating to have a higher sensitivity to oxygen than the first and second electrodes, a closure covering the first well plate, wherein at least a portion of the closure is transparent, a set of conductive pins that electrically connect to the plurality of electrodes, including a first conductive pin that connects over a first conductive trace along the bottom of the first well plate to the first electrode, a second conductive pin that connects over a second conductive trace along the bottom of the first well plate to the second electrode, and a third conductive pin that connects over a third conductive trace along the bottom of the first well plate to the third electrode;

a circuit plate having an electrical circuit configured to operatively couple to the first well plate and measure at least one of a voltage or a current between at least two of the plurality of electrodes, the electrical circuit connected to the set of conductive traces, wherein the electrical circuit is configured to multiplex the measured voltage or current of the first electrode, the second electrode, and the third electrode; and an optical instrument configured to take images inside the first well plate while the electrical circuit measures the voltage or current between the at least two of the plurality of the electrodes of the first well plate.

7. The well plate assembly of claim 6, further comprising a second well plate having at least two electrodes, a cylindrical sidewall, and a closure covering the second well plate, at least a portion of the closure being transparent, wherein the optical instrument is configured to take images inside the second well plate while the electrical circuit measures the voltage or current between the electrodes of the second well plate.

8. The well plate assembly of claim 6, wherein the plurality of electrodes comprises at least four electrodes, and the electrical circuit is configured to measure a voltage between two electrodes and a current between two other electrodes.

9. The well plate assembly of claim 8, wherein the electrical circuit is configured to multiplex the measured voltage between two electrodes and the measured current between two other electrodes.

10. The well plate assembly of claim 7, wherein the electrical circuit is configured to measure a voltage between two electrodes of the first well plate and current between two electrodes of the second well plate.

11. The well plate assembly of claim 10, wherein the electrical circuit is configured to multiplex the measured voltage between two electrodes of the first well plate and the measured current between two electrodes of the second well plate.

12. A well plate assembly for measuring one or more analytes in a sample, the assembly comprising:

a plurality of separate well plates, including a first well plate and a second well plate, wherein each of the plurality of separate well plates comprises:

a base plate defining a bottom of the respective well plate;

a sidewall extending vertically from and surrounding the base plate;

a set of electrodes including at least a first, a second, and a third electrode located at the bottom of the respective well plate, wherein the first electrode comprises surface chemistry modification having glucose oxidase as a first coating to have a higher sensitivity to glucose than the second and third electrodes, wherein the second electrode comprises a second surface chemistry modification having lactose oxidase as a second coating to have a higher sensitivity to lactate than the first and third electrodes, wherein the third electrode comprises a third surface chemistry modification having a solid-state-electrolyte as a third coating to have higher sensitivity to oxygen than the first and second electrodes;

a set of conductive pins that electrically connect to the set of electrodes, including a first conductive pin that connects over a first conductive trace along the bottom of the well plate to the first electrode, a second conductive pin that connects over a second conductive trace along the bottom of the well plate to the second electrode, and a third conductive pin that connects over a third conductive trace along the bottom of the well plate to the third electrode; and electrical circuitry operatively coupled to the set of conductive pins of the respective well plate, wherein the electrical circuitry is configured to measure the first electrode, the second electrode, and the third electrode to provide a measure of abnormal or normal cell metabolism.

13. The well plate assembly of claim 12, wherein each electrical circuitry is configured to measure at least a voltage between two electrodes in the first one of the plurality of separate well plates and a current between two electrodes in the second one of the plurality of separate well plates.

14. The well plate assembly of claim 12, wherein at least one electrode from each of the plurality of separate well plates is comprised of a same first material.

15. The well plate assembly of claim 13, wherein each electrical circuitry is configured to measure a current between two electrodes in the first one of the plurality of separate well plates.

16. The well plate assembly of claim 15, wherein each electrical circuitry is configured to measure a voltage between two electrodes in the second one of the plurality of separate well plates.

17. The well plate assembly of claim 12, wherein an electrode from the second one of the plurality of separate well plates has a higher sensitivity to a different analyte than any electrode from the first one of the plurality of separate well plates.

18. The well plate assembly of claim 14, wherein at least one second electrode from each of the plurality of separate well plates is comprised of a same material different from the first material.

19. A multimodal well plate assembly for measuring an analyte in a sample, the assembly comprising:
- a plurality of separate well plates, including a first well plate and a second well plate, wherein each of the plurality of separate well plates comprises:
  - a base plate defining a bottom of the respective well plate;
  - a sidewall extending vertically from and surrounding the base plate;
  - a set of electrodes including at least a first, a second, and a third electrode located at the bottom of the well plate, wherein the first electrode comprises surface chemistry modification having glucose oxidase as a first coating to have a higher sensitivity to glucose than the second and third electrodes, wherein the second electrode comprises a second surface chemistry modification having lactose oxidase as a second coating to have a higher sensitivity to lactate than the first and third electrodes, and wherein the third electrode comprises a third surface chemistry modification having a solid-state-electrolyte as a third coating to have higher sensitivity to oxygen than the first and second electrodes,
  - a closure covering the well plate, wherein at least a portion of the closure is transparent,
  - a set of conductive pins that electrically connect to the set of electrodes, including a first conductive pin that connects over a first conductive trace along the bottom of the well plate to the first electrode, a second conductive pin that connects over a second conductive trace along the bottom of the well plate to the second electrode, and a third conductive pin that connects over a third conductive trace along the bottom of the well plate to the third electrode, and
  - electrical circuitry operatively coupled to the set of conductive pins of the respective well plate, wherein the electrical circuitry is configured to measure the first electrode, the second electrode, and the third electrode to provide a measure of abnormal or normal cell metabolism;
- a circuit plate having an electrical circuit configured to operatively couple to the well plate and measure at least one of a voltage or a current between at least two electrodes of the first well plate, the electrical circuit connected to the set of conductive traces; and
- an optical instrument configured, via a controller, to take images inside the first well plate while the electrical circuit measures the voltage or current between the at least two electrodes of the first well plate.

20. The well plate of claim 1, wherein the electrical circuitry is further configured to determine at least one of mitochondrial respiration or glycolytic metabolism by measuring changes of the electrode measurements.

21. The well plate of claim 1, wherein the electrode measurements are used in a study of drugs.

22. The well plate of claim 1, wherein the electrode measurements are used for real-time multiple analyte measurement of single-cell or multi-cell samples.

23. The well plate of claim 1, wherein the electrode measurements are used for abnormal cellular bioenergetic assessment associated with diseases.

* * * * *